United States Patent
Kapinos et al.

(10) Patent No.: US 11,989,336 B2
(45) Date of Patent: May 21, 2024

(54) ELECTRONIC PRIVACY FILTER ACTIVATION

(71) Applicant: Lenovo (Singapore) Pte. Ltd., Singapore (SG)

(72) Inventors: Robert James Kapinos, Durham, NC (US); Scott Wentao Li, Cary, NC (US); Robert James Norton, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 263 days.

(21) Appl. No.: 17/185,391

(22) Filed: Feb. 25, 2021

(65) Prior Publication Data

US 2022/0269831 A1    Aug. 25, 2022

(51) Int. Cl.
*G06F 21/84* (2013.01)
*G06F 21/32* (2013.01)
*G06V 40/16* (2022.01)

(52) U.S. Cl.
CPC .............. *G06F 21/84* (2013.01); *G06F 21/32* (2013.01); *G06V 40/172* (2022.01)

(58) Field of Classification Search
CPC ........ G06F 21/84; G06F 21/32; G06V 40/172
USPC ............................................................ 726/2
See application file for complete search history.

(56) References Cited

U.S. PATENT DOCUMENTS

| | | | | |
|---|---|---|---|---|
| 9,898,619 | B1* | 2/2018 | Hadsall | G06F 21/6245 |
| 11,847,248 | B2* | 12/2023 | Vaughan | G06F 21/35 |
| 2010/0205667 | A1* | 8/2010 | Anderson | G06F 3/017 |
| | | | | 726/19 |
| 2017/0208241 | A1* | 7/2017 | Choi | G06F 1/1686 |

OTHER PUBLICATIONS

Asghar et al., 2019 IEEE ACESS, "Visual Surveillance Within the EU General Data Protection Regulation: A Technology Perspective", pp. 111709-111726 (Year: 2019).*
Fischer et al., 2009 IEEE 20th International Workshop on Database and Expert Systems Application, "A Pattern for Secure Graphical User Interface Systems", pp. 186-190 (Year: 2009).*

* cited by examiner

*Primary Examiner* — Khalil Naghdali
(74) *Attorney, Agent, or Firm* — Ference & Associates LLC

(57) ABSTRACT

One embodiment provides a method, including: identifying, on an information handling device, a security level associated with an application window displayed on a display screen of the information handling device; capturing, using a sensor associated with the information handling device, an image of an area in front of the display screen; identifying, based upon analysis of the image, that an individual is present in the image; determining, using a processor, whether the individual is authorized to view the application window based upon the security level; and activating, responsive to determining that the individual is not authorized to view the application window, a privacy filter that obscures content in the application window from the individual. Other aspects are described and claimed.

18 Claims, 3 Drawing Sheets

ELECTRONIC PRIVACY FILTER ACTIVATION

BACKGROUND

Information handling devices ("devices"), for example smart phones, tablet devices, laptop computers, and the like enable users to create, access, and view a variety of different types of content (e.g., images, videos, word documents, other types of digital content, etc.). This content may be contained within one or more application windows displayed on a display screen associated with the device. Certain content may be more confidential than others (e.g., work documents, financial or banking information, other types of content that are personal to an authorized user, etc.).

BRIEF SUMMARY

In summary, one aspect provides a method, including: identifying, on an information handling device, a security level associated with an application window displayed on a display screen of the information handling device; capturing, using a sensor associated with the information handling device, an image of an area in front of the display screen; identifying, based upon analysis of the image, that an individual is present in the image; determining, using a processor, whether the individual is authorized to view the application window based upon the security level; and activating, responsive to determining that the individual is not authorized to view the application window, a privacy filter that obscures content in the application window from the individual.

Another aspect provides an information handling device, including: a sensor; a display screen; a processor; a memory device that stores instructions executable by the processor to: identify a security level associated with an application window displayed on a display screen; capture an image of an area in front of the display screen; identify, based upon analysis of the image, that an individual is present in the image; determine whether the individual is authorized to view the application window based upon the security level; and activate, responsive to determining that the individual is not authorized to view the application window, a privacy filter that obscures content in the application window from the individual.

A further aspect provides a product, comprising: a storage device that stores code, the code being executable by a processor and comprising: code that captures an image associated with a user; code that identifies a security setting associated with an application window displayed on a display screen; code that captures an image of an area in front of the display screen; code that identifies, based upon analysis of the image, an individual in the image; code that determines whether the individual is authorized to view the application window based upon the security setting; and code that activates, responsive to determining that the individual is not authorized to view the application window, a privacy filter that obscures content in the application window from the individual.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
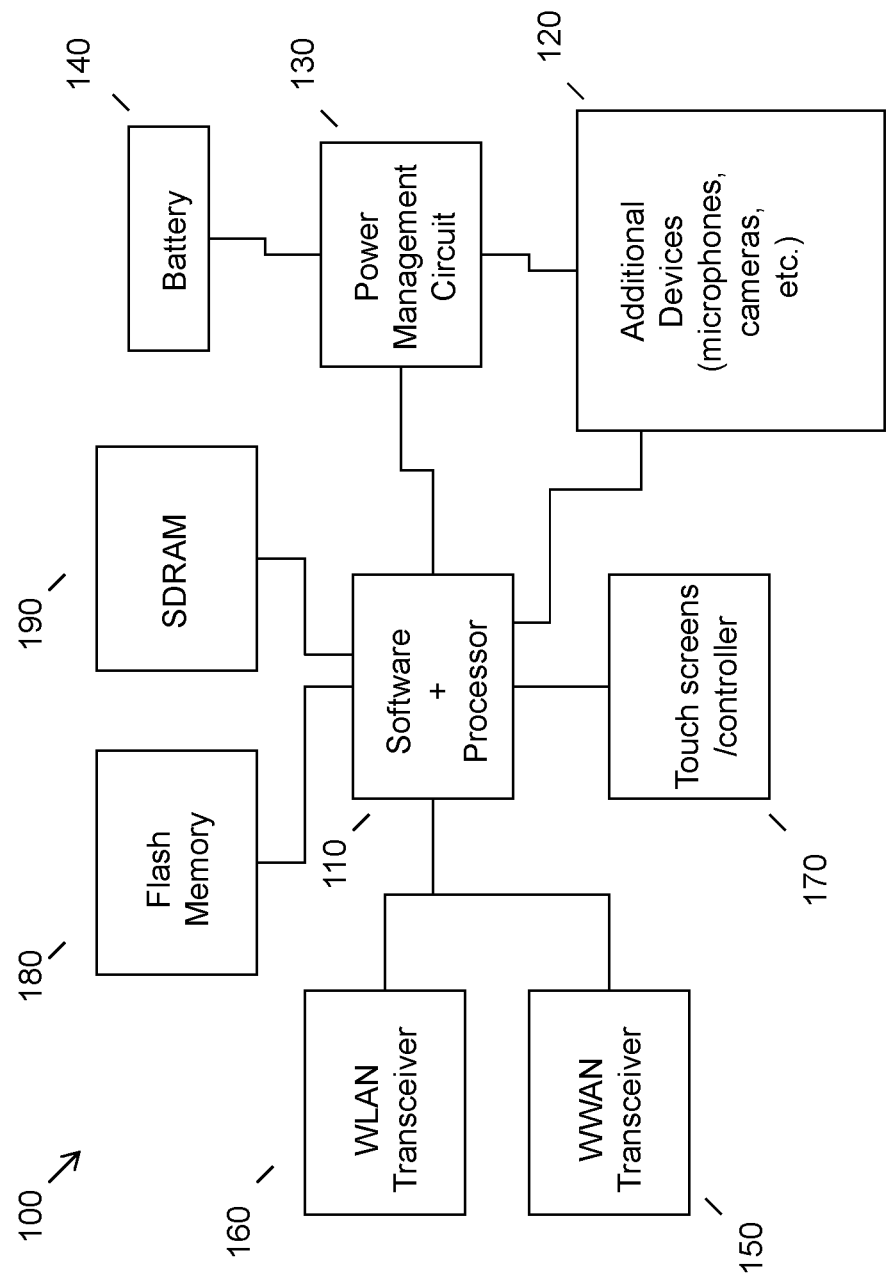
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users utilize electronic devices in nearly all aspects of modern life (e.g., to work, to conduct business, to study, to relax, etc.). Consequently, users have a strong interest in ensuring that the content that they create and/or view on their devices is secure. Such is especially true when users access confidential or highly sensitive content in conventionally unsecure spaces (e.g., an open-office work environment, a public or unrestricted location, etc.). In these places, another individual, potentially a bad actor, could observe or capture confidential information off of the user's device (e.g., by looking at, or taking a picture of, a display screen associated with the device, etc.).

One existing solution to prevent unauthorized users from viewing confidential content is the utilization of a physical privacy filter. For example, the Privacy Screen Protector by 3M contains a thin, polarized material that can be physically placed over a display screen of a device to restrict the viewing angle of the display. If the filter is effective, the device becomes barely usable by the authorized user (e.g., due to total content obscurement, etc.) and if ineffective, the filter offers minimal protection. Additionally, this style of privacy filter can be removed by a user due to their personal preference or in order to more easily view or share information with others. Once removed, the authorized user may forget to replace the filter and any subsequent viewing of confidential content may be subject to capture. 3M is a registered trademark of 3M Company in the United States of America and other countries.

Accordingly, an embodiment provides a method for activating a digital privacy filter on a device. In an embodiment, a security level associated with an application window presented on a display screen of the device may be identified. The security level may be dictated by an internal factor (e.g., confidential content designated by the user, etc.) or external factor (e.g., confidential content designated by another authority, etc.). An embodiment may then capture image data of an area in front of the device and may attempt to identify (e.g., using one or more image processing techniques, etc.) any individuals present in the image that may be able to the view the application window. Thereafter, an embodiment may determine whether the identified individuals are authorized to view the application window based on the security level. Responsive to determining that they are not authorized, an embodiment may dynamically activate an electronic privacy filter on the display screen (e.g., a privacy filter that obscures the application window, the entire display screen, etc.). Such a method may better prevent unauthorized individuals from viewing confidential information.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
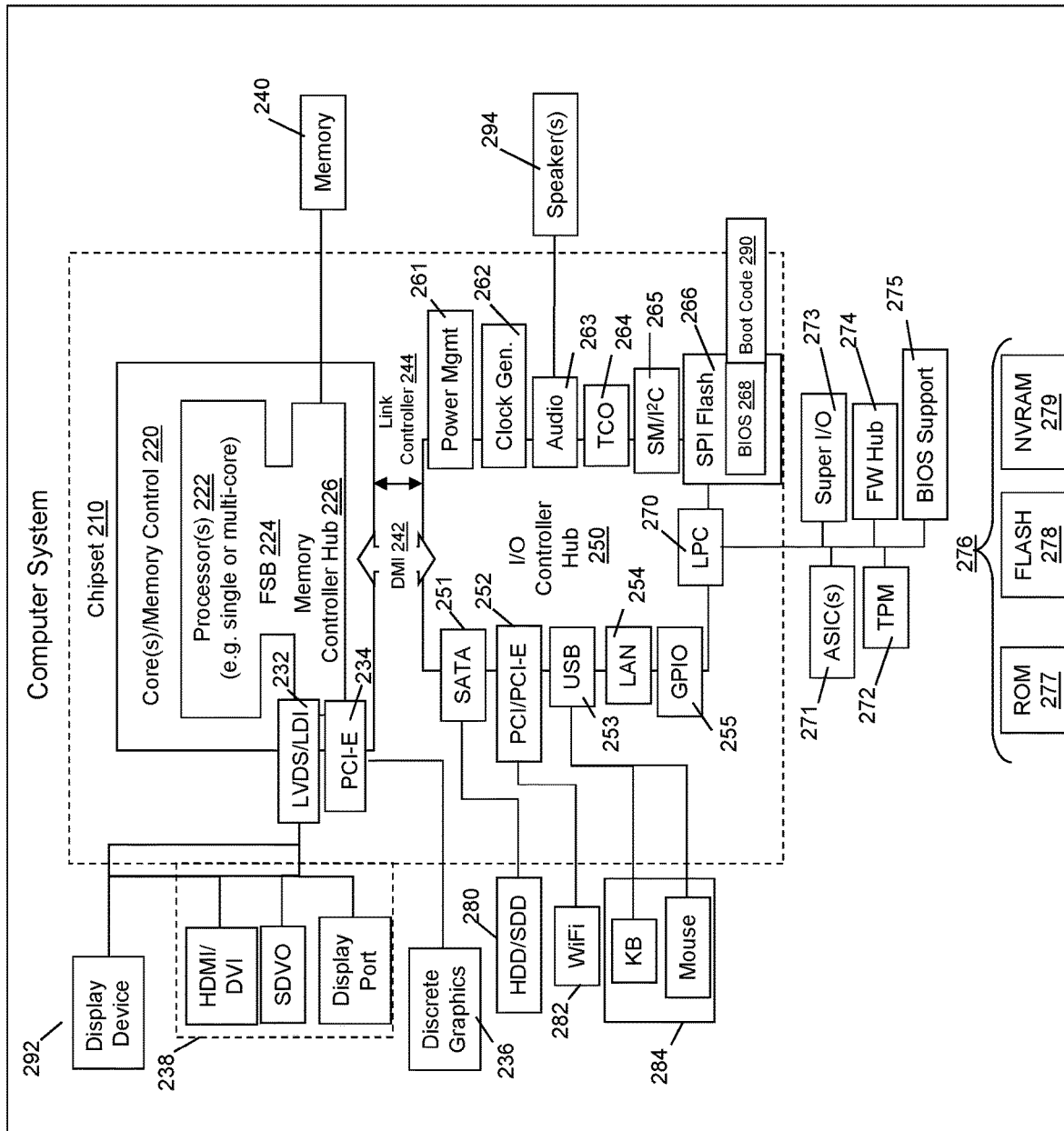
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of initiating an electronic privacy filter on a display screen associated with a device. For example, the circuitry outlined in FIG. 1 may be implemented in a smart phone or tablet embodiment, whereas the circuitry outlined in FIG. 2 may be implemented in a laptop computer.

Figure 3:
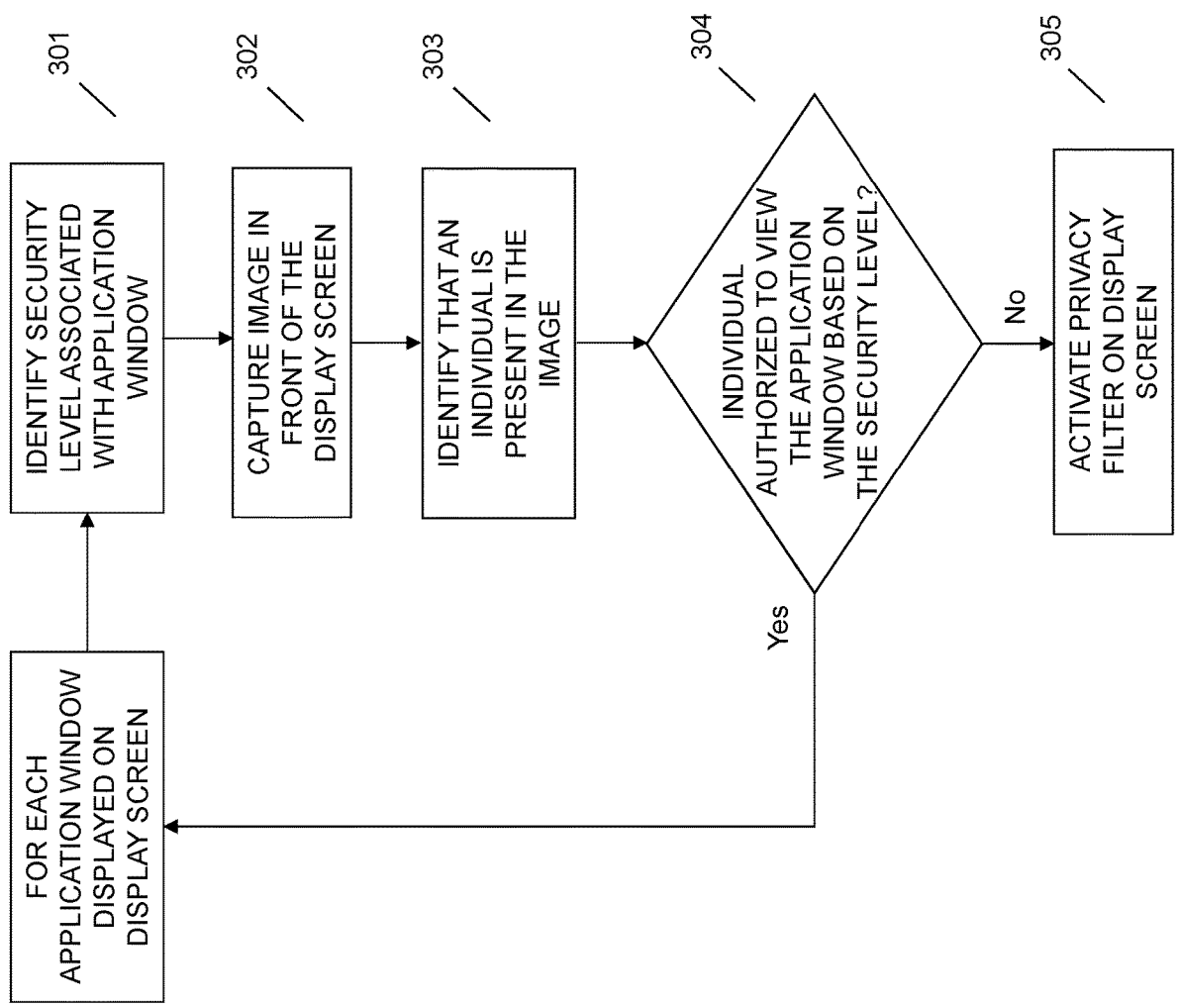
FIG. 3 illustrates an example method of activating a privacy filter.

Referring now to FIG. 3, a method for activating an electronic privacy filter on a display screen of a device is provided. Such a method may be utilized for each visible application window on the display screen. At 301, an embodiment may identify a security level associated with an application window displayed on a display screen of the device. In an embodiment, the display screen may be a screen that is integrated into the device itself or, alternatively, may be a screen that is operatively coupled to the device (e.g., an external monitor connected to a user's device, etc.). In the context of this application, an application window may refer to virtually any type of capable of displaying content on the display screen (e.g., a word processing application window, an internet browsing application window, a media viewing/streaming application window, an image editing application window, etc.).

In the context of this application, a security level for an application window may correspond to the volume and/or value of confidential or sensitive content within the application window. More particularly, an application window having a low security level may contain content that is publicly available (e.g., weather data, world news data, publicly shared user media, etc.). Conversely, an application window having a high security level may contain content that a user, or other authority (e.g., parent, employer, etc.), deems private and/or confidential.

The assignment of the security level to an application window may be based on an internal factor or an external factor. With respect to the former, an internal factor may correspond to a security level that is designated by an authorized user. More particularly, a user may identify content stored on the device, or content accessible through applications available on the device, that is confidential to them. Non-limiting examples of content that a user may designate as confidential include emails, images or videos, finance or banking information, other important documents, etc. Responsive to identifying that the user is operating the device (e.g., by identifying system-level login information, etc.) or that the user has accessed a particular application on the device (e.g., by identifying application login information, etc.), then the system may automatically assign security levels based on the identified authorized user. Specifically, the system may automatically adjust the security levels for certain application windows when they display the content designated as confidential by the user. For example, User A may launch a word processing application. The application window for the word processing application may have a low security level until the user opens a file on it that they have previously designated as confidential, at which point the security level may dynamically increase.

In situations where multiple users utilize a single device, the same application window may have different security levels based upon the operating user. For example, an internet browsing application window that displays internet browsing history may have a high security level for User A but a low security level for User B. In this situation the difference in the security level is dependent upon the confidential value that is placed on the internet browsing history by each user.

An external security level may correspond to a security level that is designated by another authority (e.g., a user's employer, etc.). More particularly, the other authority may designate the types of content stored on, or that are accessible by, the device that are confidential. Non-limiting examples of content that another authority may designate as confidential include work product (e.g., research data, result data, etc.), intra-company communications, on-going project information, and the like. When a particular user is identified as logging into the device, or into an application on the device, then the system may automatically assign security levels based on the content identified as confidential by the other authority. Similar to the foregoing, the system may automatically adjust the security levels for certain application windows when they display the content designated as confidential by the user At 302, an embodiment may utilize one or more sensors to capture an image of an area in front of the display screen. In the context of this application, an image may refer to a static image (e.g., a picture, etc.), a dynamic image (e.g., a continuous video or video clip, etc.), or both. In an embodiment, the sensor(s) may include a camera sensor, a video sensor, a multitude of either of the foregoing sensors, etc. In an embodiment, the sensor(s) may be integrally or operatively coupled to the device.

In an embodiment, the sensor may be configured to capture the image in response to a predetermined event. For example, an embodiment may capture an image when the device is turned on, when a user is detected in front of the display screen (e.g., such a detection may be facilitated by utilizing motion sensors, audio sensors, etc.), when any application window is opened, when a user requests to open an application window having a security setting above a predetermined threshold, etc. Additionally, an embodiment may capture a single image (e.g., as described above, etc.) or, alternatively, may capture multiple images at predetermined time intervals while the application window is openly displayed (e.g., every X seconds or minutes, substantially continuously, etc.).

At 303, an embodiment may identify that an individual is present in the image. The identification of a human form in the image may be facilitated by utilizing one or more image/video analysis techniques known in the art. Once a human individual has been identified, an embodiment may, if available, analyze and store the facial characteristics of that individual. This facial characteristic data may be used in downstream processes, as further described herein. If an embodiment identifies that the image contains more than one individual, then the foregoing facial analysis process may be conducted on each detected individual.

At 304, an embodiment may determine whether the individual is authorized to view the application window based upon the security level. In an embodiment, the determination may be facilitated by comparing the extracted facial characteristics of the individual to a database (e.g., stored locally on the device, stored remotely on another device or server, etc.) containing facial characteristic data for at least one individual authorized to view the application window at the security level. If a match is found between the facial characteristics of the individual identified in the image and one of the authorized individuals in the database then an embodiment may then proceed to the next application window displayed on the display screen and repeat Steps 301-304. Conversely, responsive to determining, at 304, that the individual is not authorized to view the application window (i.e., because no match is found), an embodiment may, at 305, dynamically activate, without additional user input, an electronic privacy filter that may obscure or hide the content in the application window. Additionally or alternatively, if substantially the whole screen is impacted by the results of the determination in 304, an embodiment may identify a most secure application window (i.e., one that is not subject to a privacy filter and can be viewable by unauthorized individuals) that may be presented on the screen, as further described herein.

In an embodiment, the privacy filter may correspond to an effect produced by the system that obscures the confidential content from view. For example, an embodiment may blur, censor, redact, pixelate, or otherwise visually distort only the confidential content within the relevant application window, the whole relevant application window itself, or even the entire display screen. Additionally or alternatively, an embodiment may move the application window containing the confidential content off of the display screen or transform it to an iconized state. Additionally or alternatively, in yet another embodiment, the system may identify a most secure application window and prominently, or solely, display that on the display screen. In the context of this application, a "most secure" application window may refer to an application window containing content that is conventionally not deemed confidential or sensitive and may be viewable by virtually anyone. For example, an embodiment may remove an application window containing confidential content from the display screen and replace it with an application window containing current weather data.

In an embodiment, the privacy filter may remain active for a predetermined period of time (e.g., a predetermined number of seconds, minutes, or hours, etc.) or, alternatively, may remain active until a predetermined event is detected. Regarding the latter, as an example, the privacy filter may remain active until an unauthorized individual is no longer detected in front of the display screen (i.e., that the unauthorized individual is no longer detected in a captured image).

Situations may arise where an authorized individual may originally be determined to be in an image only for an unauthorized individual to later also be detected in the image. A practical example of such a situation is when another individual attempts to look at the content of the display screen over an authorized user's shoulder. In such a situation, an embodiment may initially enable the authorized user to view the confidential content and thereafter dynamically activate the privacy filter when the unauthorized individual is detected.

In an embodiment, a privacy filter may remain active until an authorized user provides an override command to deactivate the privacy filter. The override command may be a verbal command, a keyboard command, or a touch or stylus selection that instructs the system to deactivate all, or a portion of, the privacy filter regardless of whether an unauthorized individual is determined to be in front of the display screen. Such a command may be provided to remove the privacy filter on all of the confidential content displayed on the screen. Alternatively, such a command may be provided on a per-window basis. More particularly, in situations where confidential content spans more than one application window, an authorized user may choose to remove the privacy filter on one application window while leaving the other application windows obscured.

In addition to, or in lieu of, activating the privacy filter at 305, an embodiment may also provide a notification to an authorized user. This notification may alert the user that an unauthorized individual has been detected in front of the display screen. In an embodiment, the notification may be a visual notification (e.g., a message contained in a pop-up box, an email or text message, a blinking light, etc.), an audible notification, a haptic notification, a combination thereof, and the like. In an embodiment, the notification may be presented to the user using their device or, alternatively, may be transmitted to and presented on another designated device (e.g., an alert notification may be sent to an authorized user's smart phone or wearable device, etc.).

The various embodiments described herein thus represent a technical improvement to conventional methods for activating an electronic privacy filter on a display screen of a device. Using the techniques described herein, an embodiment may identify a security setting associated with each application window displayed on the display screen associated with the device. An embodiment may also capture an image of an area in front of the display screen and identify whether a human individual is present in the image. Thereafter, an embodiment may determine whether any identified individuals are authorized to view the open application windows. Responsive to determining that an individual is not authorized to view at least one of the application windows, an embodiment may dynamically activate an electronic privacy filter that at least obscures the confidential content in the application window the individual is not authorized to view. Such a method may ensure that confidential content is only viewed and interacted with by authorized individuals.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, on an information handling device, a security level associated with an application window displayed on a display screen of the information handling device;
   capturing, using a sensor associated with the information handling device, an image of an area in front of the display screen, wherein the capturing is in response to a predetermined event;
   identifying, based upon analysis of the image, that an individual is present in the image, wherein the identifying the individual comprises identifying at least two individuals in the image;
   determining, using a processor, whether the individual is authorized to view the application window based upon the security level, wherein the security level adjusts based upon an additional application window, wherein the determining comprises determining that one of the at least two individuals is authorized to view the application window and another of the at least two individuals is not authorized to view the application window; and
   activating, responsive to determining that the individual is not authorized to view the application window, a privacy filter that obscures content in the application window from the individual.

2. The method of claim 1, wherein the capturing comprises continuously capturing the image while the application window is displayed on the display screen.

3. The method of claim 1, wherein the identifying that the individual is present in the image comprises capturing facial characteristics associated with the individual.

4. The method of claim 3, wherein the determining comprises:
   comparing the facial characteristics to a database comprising facial biometric data for a plurality of authorized individuals having access to the application window at the security level; and
   determining whether the facial characteristics share a predetermined level of similarity with the facial biometric data associated with one of the plurality of authorized individuals.

5. The method of claim 1, wherein the activating comprises maintaining the privacy filter until the another of the at least two individuals is not detected in the area.

6. The method of claim 1, further comprising receiving, from the one of the at least two individuals authorized to view the application window, an override command to deactivate the privacy filter.

7. The method of claim 1, wherein the security level is based upon an internal designation or an external designation.

8. The method of claim 1, wherein the activating the privacy filter comprises an obscuring action selected from the group consisting of: an obscuring of confidential information within the application window, an obscuring of the application window containing the confidential information, a moving of the application window off of the display screen, an iconizing of the application window, and an obscuring of the display screen.

9. The method of claim 1, further comprising providing, concurrently with the activation of the privacy filter, a notification to an authorized user that an unauthorized user is detected in the area.

10. An information handling device, comprising:
    a sensor;
    a display screen;
    a processor;
    a memory device that stores instructions executable by the processor to:
    identify a security level associated with an application window displayed on a display screen;
    capture an image of an area in front of the display screen, wherein the capturing is in response to a predetermined event;
    identify, based upon analysis of the image, that an individual is present in the image, wherein to identify the individual comprises identifying at least two individuals in the image;
    determine whether the individual is authorized to view the application window based upon the security level, wherein the security level adjusts based upon an additional application window, wherein to determine comprises determining that one of the at least two individuals is authorized to view the application window and another of the at least two individuals is not authorized to view the application window; and
    activate, responsive to determining that the individual is not authorized to view the application window, a privacy filter that obscures content in the application window from the individual.

11. The information handling device of claim 10, wherein the instructions executable by the processor to capture comprise instructions executable by the processor to continuously capture the image while the application window is displayed on the display screen.

12. The information handling device of claim 10, wherein the instructions executable by the processor to identify that the individual is present in the image comprise instructions executable by the processor to capture facial characteristics associated with the individual.

13. The information handling device of claim 12, wherein the instructions executable by the processor to determine comprise instructions executable by the processor to:
compare the facial characteristics to a database comprising facial biometric data for a plurality of authorized individuals having access to the application window at the security level; and
determine whether the facial characteristics share a predetermined level of similarity with the facial biometric data associated with one of the plurality of authorized individuals.

14. The information handling device of claim 10, wherein the activating comprises maintaining the privacy filter until the another of the at least two individuals is not detected in the area.

15. The information handling device of claim 10, wherein the instructions are further executable by the processor to receive, from the one of the at least two individuals authorized to view the application window, an override command to deactivate the privacy filter.

16. The information handling device of claim 10, wherein the security level is based upon at least one of: an intrinsic security measure and an extrinsic security measure.

17. The information handling device of claim 10, wherein the instructions executable by the processor to activate the privacy filter comprise an obscuring action selected from the group consisting of: an obscuring of confidential information within the application window, an obscuring of the application window containing the confidential information, a moving of the application window off of the display screen, an iconizing of the application window, and an obscuring of the display screen.

18. A storage device that stores code, the code being executable by a processor and comprising:
code that captures an image associated with a user;
code that identifies a security level associated with an application window displayed on a display screen;
code that captures an image of an area in front of the display screen, wherein the capturing is in response to a predetermined event;
code that identifies, based upon analysis of the image, that an individual is present in the image, wherein to identify the individual comprises identifying at least two individuals in the image;
code that determines whether the individual is authorized to view the application window based upon the security level, wherein the security level adjusts based upon an additional application window, wherein to determine comprises determining that one of the at least two individuals is authorized to view the application window and another of the at least two individuals is not authorized to view the application window; and
code that activates, responsive to determining that the individual is not authorized to view the application window, a privacy filter that obscures content in the application window from the individual.

* * * * *